(12) United States Patent
Chieffi et al.

(10) Patent No.: US 11,732,114 B2
(45) Date of Patent: Aug. 22, 2023

(54) RUBBER COMPOUND FOR TIRE PORTIONS

(71) Applicant: BRIDGESTONE EUROPE NV/SA [BE/BE], Zaventem (BE)

(72) Inventors: Gianpaolo Chieffi, Rome (IT); Aya Saiki, Rome (IT); Davide Privitera, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 286 days.

(21) Appl. No.: 17/277,444

(22) PCT Filed: Sep. 17, 2019

(86) PCT No.: PCT/EP2019/074845
§ 371 (c)(1),
(2) Date: Mar. 18, 2021

(87) PCT Pub. No.: WO2020/058259
PCT Pub. Date: Mar. 26, 2020

(65) Prior Publication Data
US 2021/0347967 A1 Nov. 11, 2021

(30) Foreign Application Priority Data
Sep. 18, 2018 (IT) .................. 102018000008676

(51) Int. Cl.
*C08L 9/00* (2006.01)
*B60C 1/00* (2006.01)

(52) U.S. Cl.
CPC .............. *C08L 9/00* (2013.01); *B60C 1/0016* (2013.01); *C08L 2312/00* (2013.01)

(58) Field of Classification Search
CPC .................................... C08L 9/00; B60C 1/00
USPC ........................................................ 524/217
See application file for complete search history.

(56) References Cited

U.S. PATENT DOCUMENTS

| | | | | |
|---|---|---|---|---|
| 6,191,206 B1 * | 2/2001 | Detrano | ................... | C08K 3/04 524/495 |
| 2009/0114321 A1 | 5/2009 | Nakamura | | |
| 2014/0128531 A1 * | 5/2014 | Miyazaki | .................. | C08L 9/00 524/496 |
| 2014/0128532 A1 * | 5/2014 | Nakamura | ............... | C08K 3/04 524/575.5 |
| 2014/0296413 A1 * | 10/2014 | Miyazaki | .................. | C08L 7/00 524/526 |
| 2014/0326928 A1 | 11/2014 | Kitago et al. | | |

FOREIGN PATENT DOCUMENTS

| EP | 2786861 A1 | 10/2014 |
|---|---|---|
| EP | 2823972 A1 | 1/2015 |

OTHER PUBLICATIONS

International Searching Authority: Search report for co-pending International Patent Application No. PCT/EP2019/074845, dated Oct. 29, 2019, 3 pages.

* cited by examiner

Primary Examiner — Deve V Hall
(74) Attorney, Agent, or Firm — Patterson Intellectual Property Law PC

(57) ABSTRACT

A rubber compound for the production of tire portions comprising a polymer base with a cross-linkable unsaturated chain, a filler system and a vulcanization system. The filler system comprises (a) a quantity, greater than or equal to 25 phr, of a first carbon black having a surface area smaller than or equal to 170 m$^2$/gr; (b) a second carbon black having a surface area greater than or equal to 300 m$^2$/gr in a quantity that is such that the ratio between the quantity of said first carbon black and the quantity of said second carbon black is greater than or equal to 5 and smaller than or equal to 13; (c) a quantity ranging between 0.5 and 2.0 phr of a dispersant agent comprised in the class of aromatic amides and having an unsaturation suited to interact with the polymer base with a cross-linkable unsaturated chain.

18 Claims, No Drawings

RUBBER COMPOUND FOR TIRE PORTIONS

The invention relates to a rubber compound comprising a reinforcing filler system, which is such as to ensure, to the compound itself, a low electrical resistance, though without causing a worsening in terms of rolling resistance.

In the tire industry there has been for a long time the need to make sure that tread portions have a low electrical resistance. Indeed, it is important for tires to have an electrical resistance value that is such as to make sure that electrostatic charges, which inevitably build up in the vehicle, are discharged to the ground, thus avoiding possible accidents to passengers. The limit resistance value usually deemed acceptable for a tire is $10^{10}$ Ohm.

In order to ensure a low resistance of the tire, solutions are known, in which the tread portion of the tire includes one or more conductor elements, each generally consisting of a conductor compound and having a surface that defines a portion of the rolling surface of the tread. As a person skilled in the art knows, the presence of these conductor elements leads to a series of drawbacks due both to a possible irregular wear of the tread as a whole and to a particular complexity in the preparation of the tread, which can further force manufacturers to use production means that are different from the ones normally used.

Another solution can be that of increasing the quantity of carbon black or of increasing the surface area thereof. This solution, despite ensuring an increase in the conductivity of the compound, leads however to a worsening in terms of rolling resistance.

Therefore, there is a strong need to have at one's disposal a solution that can ensure the creation of rubber compounds for tread portions with a lower electrical resistance, without leading to a worsening in terms of rolling resistance and of other properties of the compounds themselves.

The inventors of this invention found out that a particular combination of carbon black in the presence of a particular class of dispersant agents is capable of ensuring a significant electrical resistance decrease, without causing a worsening in terms of rolling resistance.

The subject-matter of the invention is a rubber compound for the production of tire portions comprising a polymer base with a cross-linkable unsaturated chain, a filler system and a vulcanization system; said compound being characterized in that said filler system comprises (a) a quantity, greater than or equal to 25 phr, of a first carbon black having a surface area smaller than or equal to 170 $m^2/gr$; (b) a second carbon black having a surface area greater than or equal to 300 $m^2/gr$ in a quantity that is such that the ratio between the quantity of said first carbon black and the quantity of said second carbon black is greater than or equal to 5 and smaller than or equal to 13; (c) a quantity ranging between 0.5 and 2.0 phr of a dispersant agent comprised in the class of aromatic amides and having an unsaturation suited to interact with the polymer base with a cross-linkable unsaturated chain.

Hereinafter the term "polymer base with a cross-linkable unsaturated chain" identifies any natural or synthetic non-cross-linked polymer capable of taking on all the chemical-physical and mechanical features which are typically assumed by elastomers following a cross-linking (vulcanization) with sulphur-based systems.

Hereinafter the term vulcanization system indicates an assembly of ingredients comprising at least sulphur and accelerator agents, which, in the preparation of the compound, are added in a final mixing step and fulfil the aim of supporting the vulcanization of the polymer base once the compound is subjected to a vulcanization temperature.

Preferably, said dispersant agent is comprised in the compound in a quantity ranging from 1.0 to 1.5 phr.

Preferably, said dispersant agent is (2Z)-4-[(4-aminophenyl)amino]-4-oxo-2-butenoic acid sodium salt.

Preferably, said first carbon black has a surface area smaller than or equal to 100 $m^2/gr$.

Preferably, the ratio between the quantity of said first carbon black and the quantity of said second carbon black is greater than or equal to 7 and smaller than or equal to 11.

A further subject-matter of the invention is a tire portion manufactured with the compound according to the invention.

A further subject-matter of the invention is a tire comprising a portion manufactured with the compound according to the invention.

Below are some explanatory and non-limiting examples.

EXAMPLES

Six compounds were produced, five of them being comparison compounds and one of them being a compound according to the invention.

In particular, the first compound (compound A) is a first comparison example and is a standard compound used to produce a carcass portion. Compound A comprises, as filler, a carbon black with a surface area of 50 $m^2/gr$ (which falls within the definition of "first carbon black" according to the appended claims), whereas it does not comprise any type of plasticizer). The second compound (Compound B) is another comparison example and is different from Compound A because it involves the addition of a further carbon black with a surface area of 150 $m^2/gr$ (which falls within the definition of "first carbon black" according to the appended claims). The third compound (Compound C) is a further comparison compound and is different from Compound B because it involves the addition of a dispersant agent fulfilling the features set forth in the appended claims. The fourth compound (Compound D) is a further comparison compound and is different from Compound A because it involves the addition of a further carbon black with a surface area of 300 $m^2/gr$ (which falls within the definition of "second carbon black" according to the appended claims). The fifth compound (Compound E) is a compound according to the invention and is different from Compound D because it involves the addition of a dispersant agent fulfilling the features set forth in the appended claims. The sixth compound (Compound F) is a further comparison compound and is different from Compound E because the dispersant agent used does not fulfil the features set forth in the appended claims.

The compounds of the examples were prepared according to a standard procedure, which is not relevant for the purposes of the invention.

—Preparation of the Compounds—
(First Mixing Step)

The cross-linkable polymer base, the carbon black and, when provided, the dispersant gent were loaded into a mixer with tangential rotors and with an inner volume ranging from 230 to 270 litres before the beginning of the mixing, thus reaching a filling factor ranging from 66 to 72%.

The mixer was operated at a speed ranging from 40 to 60 revolutions/minute and the mixture resulting therefrom was removed after having reached a temperature ranging from 140 to 160° C.

(Second Mixing Step)

The mixture obtained from the preceding step was newly processed in a mixer operated at a speed ranging from 40 to 60 revolutions/minute and, subsequently, was removed after having reached a temperature ranging from 130 to 15° C.

(Final Mixing Step)

The vulcanization system was added to the mixture obtained from the preceding step, thus reaching a filling factor ranging from 63 to 67%.

The mixer was operated at a speed ranging from 20 to 40 revolutions/minute and the mixture resulting therefrom was removed after having reached a temperature ranging from 100 to 110° C.

Table I shows the compositions in phr of the six compounds described above.

TABLE I

|  | A | B | C | D | E | F |
|---|---|---|---|---|---|---|
| NR |  |  |  | 40 |  |  |
| BR |  |  |  | 60 |  |  |
| CB N550 |  |  |  | 35 |  |  |
| CB N134 | — | 20 | 20 | — | — | — |
| CB* | — | — | — | 4 | 4 | — |
| Dispersant agent* | — | — | 1.2 | — | 1.2 | — |
| Dispersant agent** | — | — | — | — | — | 1.2 |
| Sulphur |  |  |  | 2.0 |  |  |
| Accelerators |  |  |  | 2.5 |  |  |
| Antioxidants |  |  |  | 4.5 |  |  |
| ZnO |  |  |  | 3.0 |  |  |
| Stearic acid |  |  |  | 2.0 |  |  |

NR is a 1,4-cis polyisoprene rubber of natural origin.
BR is a butadiene rubber with a 1,4 cis content of at least 40%.
N550 indicates a surface area of the carbon black equal to 50 m$^2$/gr.
N134 indicates a surface area of the carbon black equal to 150 m$^2$/gr.
CB* indicates a carbon black with a surface area equal to 300 m$^2$/gr.

The dispersant agent* is (2Z)-4-[(4-aminophenyl)amino]-4-oxo-2-butenoic acid sodium salt, whose structure is shown below.

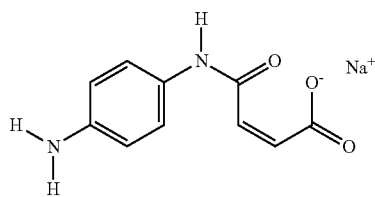 [SMILES: Nc1ccc(NC(=O)/C=C\C(=O)[O-])cc1 ; [Na+]]

The dispersant agent** is N'-(1,3-dimethylbutylidene)-3-hydroxy-2-naphtoydrazide (BMH).

The compounds shown in Table I, once vulcanized, were subjected to electrical resistance and rolling resistance measurements.

The rolling resistance values are tightly connected to the Tan D values at 60° C. (the smaller the Tan D value at 60° C., the better the rolling resistance) measured, as dynamic-mechanical properties, according to standard ISO 4664.

Table II shows the results of the tests mentioned above.

In order to more clearly show the advantages resulting from the invention, the rolling resistance values of Table II are indexed to the relative value of the comparison compound (Compound A).

TABLE II

|  | A | B | C | D | E | F |
|---|---|---|---|---|---|---|
| Rolling resistance | 100 | 93 | 95 | 98 | 100 | 10 |
| Electrical resistance | $10^{10}$ | $10^5$ | $2 \times 10^5$ | $5 \times 10^5$ | $5 \times 10^6$ | $10^{10}$ |

The values shown in Table II clearly indicate that only Compound E, which fulfils the technical features claimed, is capable of ensuring a low level of electrical resistance, without for this reason worsening the rolling resistance levels.

In particular, it should be pointed out that:

Compound C, even though comprising the dispersant agent with the specifications set forth in the claims and a mixture of two carbon blacks with a different surface area, however, is not capable of avoiding a worsening of the rolling resistance values, as the added carbon black does not fulfil the conditions claimed;

Compound D, even though comprising a mixture of carbon black fulfilling the features claimed, however, is not capable of avoiding a worsening of the rolling resistance value due to the absence of the dispersant agent;

Compound F, despite comprising a mixture of carbon black fulfilling the features claimed, however, is not capable of improve rolling resistance nor reduce electrical resistance, as it comprises a dispersant agent which does not fulfil the features set forth in the appended claims.

The invention claimed is:

1. A rubber compound for the production of tire portions comprising:
   a polymer base with a cross-linkable unsaturated chain;
   a filler system including:
      a quantity, greater than or equal to 25 phr, of a first carbon black having a surface area smaller than or equal to 170 m2/gr;
      a quantity of a second carbon black having a surface area greater than or equal to 300 m2/gr, such that the ratio between the quantity of the first carbon black and the quantity of the second carbon black is greater than or equal to 5 and smaller than or equal to 13; and
      a quantity ranging between 0.5 and 2.0 phr of a dispersant agent comprising an aromatic amide and having an unsaturation suited to interact with the polymer base with a cross-linkable unsaturated chain; and
   a vulcanization system.

2. The rubber compound of claim 1, wherein the quantity of the dispersant agent ranges between 1.0 to 1.5 phr.

3. The rubber compound of claim 1, wherein the dispersant agent is

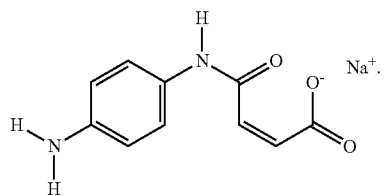

4. The rubber compound of claim 1, wherein the first carbon black has a surface area smaller than or equal to 100 m2/gr.

5. The rubber compound of claim 1, wherein the ratio between the quantity of the first carbon black and the quantity of the second carbon black is greater than or equal to 7 and smaller than or equal to 11.

6. The rubber compound of claim 1, wherein the vulcanization system comprises an assembly of ingredients including sulphur and accelerator agents.

7. The rubber compound of claim 1, wherein a filling factor ranges between 63 to 67%.

8. The rubber compound of claim 1, wherein a tire portion comprises the rubber compound.

9. The rubber compound of claim 1, wherein a tire comprises a tire tread made of the rubber compound.

10. The rubber compound of claim 8, wherein a tire comprises the tire portion made of the rubber compound.

11. A tire portion comprising:
a rubber compound comprising:
  a polymer base with a cross-link able unsaturated chain;
  a filler system including:
    a quantity, greater than or equal to 25 phr, of a first carbon black having a surface area smaller than or equal to 170 m²/gr;
    a quantity of a second carbon black having a surface area greater than or equal to 300 m²/gr, such that the ratio between the quantity of the first carbon black and the quantity of the second carbon black is greater than or equal to 5 and smaller than or equal to 13;
    a quantity ranging between 0.5 and 2.0 phr of a dispersant agent comprising an aromatic amide and having an unsaturation suited to interact with the polymer base with a cross-linkable unsaturated chain; and
  a vulcanization system.

12. The tire portion of claim 11, wherein the quantity of the dispersant agent ranges between 1.0 to 1.5 phr.

13. The portion tire of claim 11, wherein the dispersant agent is

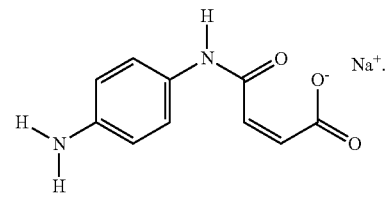

14. The tire portion of claim 11, wherein the first carbon black has a surface area smaller than or equal to 100 m2/gr.

15. The tire portion of claim 11, wherein the ratio between the quantity of the first carbon black and the quantity of the second carbon black is greater than or equal to 7 and smaller than or equal to 11.

16. The tire portion of claim 11, wherein the vulcanization system comprises an assembly of ingredients including sulphur and accelerator agents.

17. The tire portion of claim 11, wherein a filling factor ranges between 63 to 67%.

18. The tire portion of claim 11, further comprising:
a tire tread; and
wherein the tire tread is made of the rubber compound.

* * * * *